US012469860B2

(12) United States Patent
Baird et al.

(10) Patent No.: US 12,469,860 B2
(45) Date of Patent: Nov. 11, 2025

(54) SYSTEMS AND METHODS FOR PROVIDING HEAT CONTROL IN A MULTI-STACK FUEL CELL SYSTEM

(71) Applicant: INTELLIGENT ENERGY LIMITED, Loughborough (GB)

(72) Inventors: Scott Baird, Loughborough (GB); Philip Thomas Jackson, Loughborough (GB); James Watton, Loughborough (GB); Brendan Devaney, Loughborough (GB); Ian Stuart Kenyon, Loughborough (GB)

(73) Assignee: INTELLIGENT ENERGY, Loughborough (GB)

( * ) Notice: Subject to any disclaimer, the term of this patent is extended or adjusted under 35 U.S.C. 154(b) by 885 days.

(21) Appl. No.: 17/767,820

(22) PCT Filed: Oct. 8, 2020

(86) PCT No.: PCT/EP2020/078333
§ 371 (c)(1),
(2) Date: Apr. 8, 2022

(87) PCT Pub. No.: WO2021/069622
PCT Pub. Date: Apr. 15, 2021

(65) Prior Publication Data
US 2025/0260026 A1 Aug. 14, 2025

(30) Foreign Application Priority Data
Oct. 11, 2019 (GB) ...................... 1914759

(51) Int. Cl.
*H01M 8/04537* (2016.01)
*H01M 8/04007* (2016.01)
(Continued)

(52) U.S. Cl.
CPC .... *H01M 8/04007* (2013.01); *H01M 8/04225* (2016.02); *H01M 8/04302* (2016.02);
(Continued)

(58) Field of Classification Search
CPC ......... H01M 8/04007; H01M 8/04225; H01M 8/04302; H01M 8/0432; H01M 8/0438;
(Continued)

(56) References Cited

U.S. PATENT DOCUMENTS 8,872,392 B1\* 10/2014 Gurunathan ...... H01M 8/04619
307/151
2002/0037443 A1 3/2002 Christen et al.
(Continued)

FOREIGN PATENT DOCUMENTS

CN 101438444 A 5/2009
FR 3047844 A1 8/2017
(Continued)

OTHER PUBLICATIONS

International Patent Application No. PCT/EP2020/078333; Int'l Search Report and the Written Opinion; dated Feb. 11, 2021; 12 pages.
(Continued)

*Primary Examiner* — Christian Roldan
(74) *Attorney, Agent, or Firm* — BAKER HOSTETLER, LLP; Mark H. Krietzman

(57) ABSTRACT

The present disclosure pertains to a system (5) comprising a plurality of power converters (20-1 to 20-n) configured, via a processing device (30), to balance heat from a plurality of fuel cell stacks (10-1 to 10-n). Some embodiments may: set one or more parameter values of one of the power converters (20-1) located at the output of one of the plurality of stacks (10-1) such that the one stack preferentially provides power to a load; determine a heat power of the one stack (10-1) and
(Continued)

of one or more other stacks of the plurality of stacks (10-2 to 10-n), each of the heat powers being determined based on a voltage and current that are determined at the input of the respective power converter (20-1 to 20-n); determine whether the heat power of the one stack (20-1) satisfies a criterion; and responsive to a determination that the heat power of the one stack satisfies the criterion, set one or more parameter values of each of the power converters (20-2 to 20-n) located at the output of the one or more other stacks such that the determined heat power of each of the one or more other stacks (10-2 to 10-n) more closely matches the determined heat power of the one stack (10-1).

15 Claims, 2 Drawing Sheets

(51) Int. Cl.
*H01M 8/04225* (2016.01)
*H01M 8/04302* (2016.01)
*H01M 8/0432* (2016.01)
*H01M 8/0438* (2016.01)
*H01M 8/04858* (2016.01)

(52) U.S. Cl.
CPC ....... *H01M 8/0432* (2013.01); *H01M 8/0438* (2013.01); *H01M 8/04567* (2013.01); *H01M 8/04597* (2013.01); *H01M 8/04619* (2013.01); *H01M 8/0494* (2013.01)

(58) Field of Classification Search
CPC ......... H01M 8/04567; H01M 8/04597; H01M 8/04619; H01M 8/0494
USPC ........................................................ 429/429
See application file for complete search history.

(56) References Cited

U.S. PATENT DOCUMENTS

| 2009/0075127 | A1 | 3/2009 | Lienkamp et al. |
| 2009/0110993 | A1 | 4/2009 | Backhaus-Ricoult et al. |
| 2011/0171500 | A1* | 7/2011 | Yamanaka ........ H01M 8/04365 |
| | | | 429/442 |
| 2012/0326516 | A1* | 12/2012 | Gurunathan ............ H02J 3/381 |
| | | | 307/43 |
| 2016/0072138 | A1 | 3/2016 | Roberts et al. |
| 2016/0133955 | A1 | 5/2016 | Ozawa |

FOREIGN PATENT DOCUMENTS

| JP | S61-214368 A | 9/1986 |
| JP | 2006-049151 A | 2/2006 |
| JP | 2009-059610 A | 3/2009 |
| JP | 2009-259408 A | 11/2009 |
| JP | 2011-502338 A | 1/2011 |
| JP | 2016-174519 A | 9/2016 |
| JP | 6353477 B2 | 7/2018 |
| KR | 2013-0027236 A | 3/2013 |
| KR | 10-2482214 B1 | 12/2022 |
| WO | WO 2021/069622 A1 | 4/2021 |

OTHER PUBLICATIONS

International Patent Application No. PCT/EP2020/078333; Int'l Preliminary Report on Patentability; dated Apr. 21, 2022; 9 pages.

* cited by examiner

SYSTEMS AND METHODS FOR PROVIDING HEAT CONTROL IN A MULTI-STACK FUEL CELL SYSTEM

This application is the US National Phase of International application No. PCT/EP2020/078333, filed Oct. 8, 2020, titled SYSTEMS AND METHODS FOR PROVIDING HEAT CONTROL IN A MULTI-STACK FUEL CELL SYSTEM, which claims the benefit of Great Britain 1914759.4, filed Oct. 11, 2019, the contents of which are incorporated by reference herein in their entirety.

TECHNICAL FIELD

The present disclosure relates generally to systems and methods for controlling fuel cell stacks and respective power converters sure that the stacks degrade at substantially equal rates.

BACKGROUND

A fuel cell stack consists of a multitude of single cells stacked up so that the cathode of one cell is electrically connected to the anode of the adjacent cell. In that way, exactly the same current passes through each of the cells. Efficient fuel cell power sources require proper temperature control and heat management to ensure reliable operation. For example, higher operating temperatures often cause more produced water to be vaporized and thus more waste heat, which risks damage to the fuel cell stacks (e.g., membrane dry-out) and/or exacerbation of performance degradation.

Fuel cell stacks perform differently, even when new, based on their manufacturing tolerances and on how they are each run. Over time the stacks degrade, but their performance does not degrade at exactly a same rate, even when an electrical load is equally shared between all stacks. The stacks degrade at different rates, which leads to a weakest or worst faring one having to increasingly exert itself and work proportionally harder than the others to keep up. Under such conditions, fuel cell stacks degrade further, such as in runaway states or negative feedback loops, wherein the stacks get rapidly worse causing the life of a comprising system to dramatically shorten. Merely cooling a weakest stack further is not a viable solution, since there exists a squared relationship in that twice as much air flow from fans cost four times as much in parasitic power.

SUMMARY

Systems and methods are disclosed for controlling heat generation of a plurality of fuel cell stacks. Accordingly, one or more aspects of the present disclosure relate to a method for configuring a plurality of power converters such that heat is balanced. Some embodiments may: set one or more parameter values of one of the power converters located at the output of one of the plurality of stacks such that the one stack preferentially provides power to a load; determine a heat power of the one stack and of one or more other stacks of the plurality of stacks, each of the heat powers being determined based on a voltage and current that are determined at the input of the respective power converter; determine whether the heat power of the one stack satisfies a criterion; and responsive to a determination that the heat power of the one stack satisfies the criterion, set one or more parameter values of each of the power converters located at the output of the one or more other stacks such that the determined heat power of each of the one or more other stacks more closely matches the determined heat power of the one stack.

The method is implemented by a system comprising one or more hardware processors configured by machine-readable instructions and/or other components. The system comprises the one or more processors and other components or media, e.g., upon which machine-readable instructions may be executed. Implementations of any of the described techniques may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Like reference numerals may refer to like elements throughout the specification. Other features will be apparent from the following description, including the drawings and claims. The drawings, though, are for the purposes of illustration and description only and are not intended as a definition of the limits of the disclosure.

DETAILED DESCRIPTION

As used throughout this application, the word "may" is used in a permissive sense (i.e., meaning having the potential to), rather than the mandatory sense (i.e., meaning must). The words "include", "including", and "includes" and the like mean including, but not limited to. As used herein, the singular form of "a", "an", and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other.

Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

Figure 1:
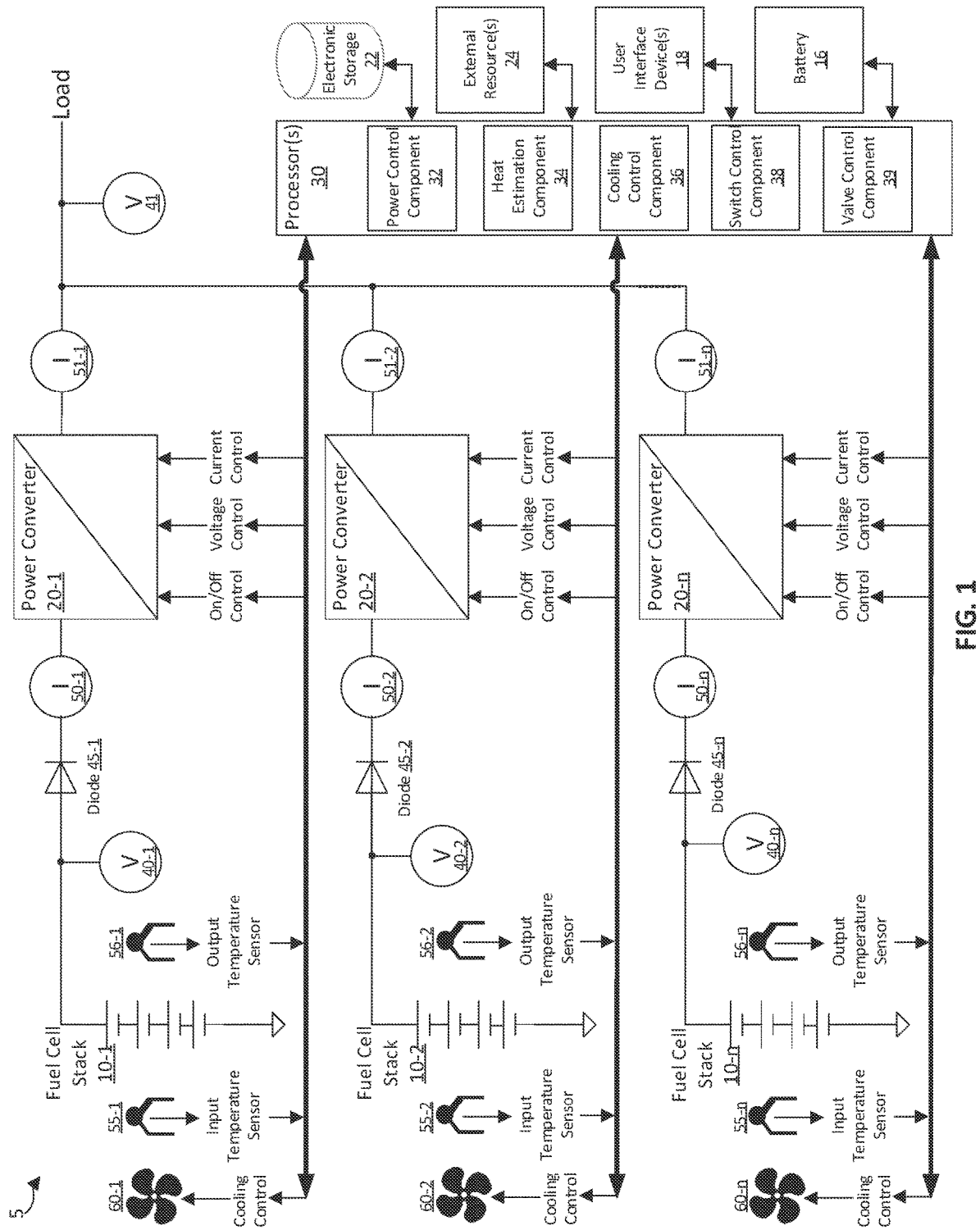
FIG. 1 illustrates an example of a system in which heat produced by fuel cell stacks is balanced, in accordance with one or more embodiments.

FIG. 1 illustrates a multi-stack fuel cell power system 5 comprising power converters 20 that are configured, at a time, such that a set of stacks 10 follow the heat of one of the stacks 10. This one stack, at this time, may be assigned to be the prime stack. And, although an electrical load limit may be set for this stack (e.g., to limit a rate of change), this stack effectively load-follows. The remaining stacks may be controlled based on a heat set-point to achieve, which may be derived from the amount of heat being produced by the prime stack. At another, subsequent time, another one stack of the set may be instead designated and controlled as the prime stack.

In some embodiments, outputs of power converters 20 of system 5 are attached in a parallel configuration such that stacks 10-1 to 10-n (n being a natural number) supply power to a load. In some embodiments, power converters 20 are DC-to-DC (DC/DC) converters, which comprise electronic circuits or electromechanical devices that convert a source of direct current (DC) from one voltage level to another. For example, each power converter 20 may be a DC/DC buckboost converter, linear regulator, voltage regulator, motor-generator, rotary converter, or switched-mode power supply. In some embodiments, the outputs of power converters 20 are regulated. And, in some embodiments, the power supplied to the load may be linear, switched, or battery based.

In some embodiments, each power converter 20 has one or more analog inputs, such as a voltage setpoint and current limit, for controlling an output power from the each power converter. For example, power control component 32 may set the voltage of each of power converters 20-2 to 20-n (n being a natural number) higher than the voltage setpoint of power converter 20-1 such that power converters 20-2 to 20-n preferentially feed a load. In this example, power control component 32 may configure power converter 20-1 as the prime stack by setting its current limit higher than the current limits of power converters 20-2 to 20-n. When the load demand satisfies a criterion and thus when a considerable amount of power is being drawn from system 5, stack 10-1 and power converter 20-1 may be involved in supplying that excess power demand. But because heat estimation component 34 may determine a heat power generated from each of stacks 10, power control component 32 may increase the current limit of each of power converters 20-2 to 20-n such that power converters 20-2 to 20-n deliver more power. In some implementations, heat estimation component 34 may periodically or irregularly determine these heat powers. In another implementation, heat estimation component 34 may determine these heat powers based on a request received from a user via user interface 18.

In some embodiments, power control component 32 may configure one stack 10 to be the prime stack by particularly controlling output current limits and voltage setpoints of power converters 20. In some embodiments, power control component 32 may configure stacks 10 as prime to supply transient loads by following the power cycle. In some embodiments, power control component 32 alternates which of stacks 10 acts as the prime stack. In some implementations, more than one stack may operate as prime. In any of these instances, the other stacks not currently operating as prime may be caused to increase or decrease their power generation to follow the heat generation of the prime stack.

In some embodiments, power control component 32 may configure a weakest or unhealthiest stack 10 to be the prime stack. In these or other embodiments, power control component 32 may configure a strongest or healthiest stack 10 to be the prime stack. A prime stack may generally follow the load. For example, if the load is zero, the prime stack and all other stacks may provide no power; but, when the load increases, the power converter of the prime stack may follow the load. That is, the prime stack power may ramp up as fast as it can to match the load. Effectively, all stacks 10 in system 5 may follow the load by correspondingly providing power, but the prime stack may take the lead, and the other stacks may follow the prime stack. This may not imply, though, that prime stack 10 will overshoot the equally shared level. Stacks 10 other than prime stack 10 may follow the prime stack such that they try to match the heat power (or another matching parameter) of the prime stack and follow behind. In another example, the prime stack may be inactive (while all other stacks are actively sourcing power), until a demand from the load raises beyond a threshold.

Electronic storage 22 of FIG. 1 comprises electronic storage media that electronically stores information. The electronic storage media of electronic storage 22 may comprise system storage that is provided integrally (i.e., substantially non-removable) with system 5 and/or removable storage that is removably connectable to system 5 via, for example, a port (e.g., a USB port, a firewire port, etc.) or a drive (e.g., a disk drive, etc.). Electronic storage 22 may be (in whole or in part) a separate component within system 5, or electronic storage 22 may be provided (in whole or in part) integrally with one or more other components of system 5 (e.g., a user interface device 18, processor 30, etc.). In some embodiments, electronic storage 22 may be located in a server together with processor 30, in a server that is part of external resources 24, in user interface devices 18, and/or in other locations. Electronic storage 22 may comprise a memory controller and one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 22 may store software algorithms, information obtained and/or determined by processor 30, information received via user interface devices 18 and/or other external computing systems, information received from external resources 24, and/or other information that enables system 5 to function as described herein.

External resources 24 may include sources of information (e.g., databases, websites, etc.), external entities participating with system 5, one or more servers outside of system 5, a network, electronic storage, equipment related to Wi-Fi technology, equipment related to Bluetooth® technology, data entry devices, a power supply, a transmit/receive element (e.g., an antenna configured to transmit and/or receive wireless signals), a network interface controller (NIC), a display controller, a graphics processing unit (GPU), and/or other resources. In some implementations, some or all of the functionality attributed herein to external resources 24 may be provided by other components or resources included in system 5. Processor 30, external resources 24, user interface device 18, electronic storage 22, network 70, and/or other components of system 5 may be configured to communicate with each other via wired and/or wireless connections, such as a network (e.g., a local area network (LAN), the Internet, a wide area network (WAN), a radio access network (RAN), a public switched telephone network (PSTN)), cellular technology (e.g., GSM, UMTS, LTE, 5G, etc.), Wi-Fi technology, another wireless communications link (e.g., radio frequency (RF), microwave, infrared (IR), ultraviolet (UV), visible light, cmWave, mmWave, etc.), a base station, and/or other resources.

User interface device(s) 18 of system 5 may be configured to provide an interface between one or more users and system 5. User interface devices 18 are configured to provide information to and/or receive information from the one or more users. User interface devices 18 include a user interface and/or other components. The user interface may be and/or include a graphical user interface configured to present views and/or fields configured to receive entry and/or selection with respect to particular functionality of system 5, and/or provide and/or receive other information. In some embodiments, the user interface of user interface devices 18 may include a plurality of separate interfaces associated with processors 30 and/or other components of system 5. Examples of interface devices suitable for inclusion in user interface device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that user interface devices 18 include a removable storage interface. In this example, information may be loaded into user interface devices 18 from removable storage (e.g., a smart card, a flash drive, a removable disk) that enables users to customize the implementation of user interface devices 18.

In some embodiments, user interface devices 18 are configured to provide a user interface, processing capabilities, databases, and/or electronic storage to system 5. As such, user interface devices 18 may include processors 30, electronic storage 22, external resources 24, and/or other components of system 5. In some embodiments, user interface devices 18 are connected to a network (e.g., the Internet). In some embodiments, user interface devices 18 do not include processor 30, electronic storage 22, external resources 24, and/or other components of system 5, but instead communicate with these components via dedicated lines, a bus, a switch, network, or other communication means. The communication may be wireless or wired. In some embodiments, user interface devices 18 are laptops, desktop computers, smartphones, tablet computers, and/or other user interface devices.

Data and content may be exchanged between the various components of the system 5 through a communication interface (e.g., hard-wired lines, a bus, etc.) and communication paths using any one of a number of communications protocols corresponding to the different media delivery platforms.

In some embodiments, processor 30 may belong to a user device, a consumer electronics device, a mobile phone, a smartphone, a personal data assistant, a digital tablet/pad computer, a wearable device (e.g., watch), a personal computer, a laptop computer, a notebook computer, a work station, a server, a high performance computer (HPC), a vehicle computer, a game or entertainment system, a set-top-box or any other device. As such, processor 30 is configured to provide information processing capabilities in system 5. Processor 30 may comprise one or more of a microcontroller, a digital processor, an analog processor, a digital circuit designed to process information, an analog circuit designed to process information, a state machine, and/or other mechanisms for electronically processing information. Although processor 30 is shown in FIG. 1 as a single entity, this is for illustrative purposes only. In some embodiments, processor 30 may comprise a plurality of processing units. These processing units may be physically located within the same device (e.g., a server), or processor 30 may represent processing functionality of a plurality of devices operating in coordination (e.g., one or more servers, user interface devices 18, devices that are part of external resources 24, electronic storage 22, and/or other devices).

As shown in FIG. 1, processor 30 is configured via machine-readable instructions to execute one or more computer program components. The computer program components may comprise one or more of power control component 32, heat estimation component 34, cooling control component 36, switch control component 38, valve control component 39, and/or other components. Processor 30 may be configured to execute components 32, 34, 36, 38, and/or 39 by: software; hardware; firmware; some combination of software, hardware, and/or firmware; and/or other mechanisms for configuring processing capabilities on processor 30.

It should be appreciated that although components 32, 34, 36, 38, and 39 are illustrated in FIG. 1 as being co-located within a single processing unit, in embodiments in which processor 30 comprises multiple processing units, one or more of components 32, 34, 36, 38, and/or 39 may be located remotely from the other components. For example, in some embodiments, each of processor components 32, 34, 36, 38, and 39 may comprise a separate and distinct set of processors. The description of the functionality provided by the different components 32, 34, 36, 38, and/or 39 described below is for illustrative purposes, and is not intended to be limiting, as any of components 32, 34, 36, 38, and/or 39 may provide more or less functionality than is described. For example, one or more of components 32, 34, 36, 38, and/or 39 may be eliminated, and some or all of its functionality may be provided by other components 32, 34, 36, 38, and/or 39. As another example, processor 30 may be configured to execute one or more additional components that may perform some or all of the functionality attributed below to one of components 32, 34, 36, 38, and/or 39.

In some embodiments, power control component 32 may determine an amount of stacks 10 and particular ones of stacks 10 presently operating in system 5 such that various different combinations of stacks 10 are utilized in sourcing power to a load. For example, power control component 32 and heat estimation component 34 may cause creation of configuration(s) of operating power converters 20 for feeding the load. In this or another example, switches may be configured such that the load consumes power from one or more of stacks 10-1, 10-2, . . . 10-*n*. In some embodiments, the load comprises a plurality of loads.

In some embodiments, power control component 32 may be configured to identify and automatically determine one or more parameter values for each power converter 20. These parameter values may comprise at least one of a current limit, a voltage setpoint, an on/off setting, and another suitable control signal. By controlling these parameter values, power converters 20 may be under complete power control by power control component 32. In some embodiments, power converters 20 may determine among themselves their own output voltages based on a desired, input voltage received via user interface 18 and communicated to the respective power converter 20 via a voltage control signal from power control component 32.

In some embodiments, power control component 32 may set a maximum current limit and/or a voltage setpoint of each power converter 20 in system 5. For example, power converter 20-1 may be set to deliver power at 48 Volts (V), and one or more power converter 20-2 to 20-*n* may be set to deliver power at 49 V. But this is not intended to be limiting, as each of the one or more power converters may be set individually and thus to a distinct and potentially different current and/or voltage.

In some embodiments, power control component 32 may configure one or more power converters 20 such that one or more stacks 10 operates as a prime stack. In some implementations, power control component 32 may receive as input via user interface device 18 a voltage setting for a prime stack of system 5. Power control component 32 may then configure an output voltage of a power converter associated with this stack based on the received voltage and configure output voltages of power converters associated with all other stacks of system 5 to a slightly higher voltage than the output voltage associated with the prime stack. By this configuration, the other stacks will preferentially feed. That is, prime stack 10, by having that lower setpoint than the others, will allow the other stacks 10 to feed first. But, by setting the current limit of the prime stack's power converter 20 higher than the current limit of the other stacks' power converters 20, the prime stack's power converter may, when there is extra load to be pulled off, facilitate delivery of more current to the load.

In some implementations, power control component 32 may control power converter 20 associated with prime stack 10 such that the prime stack preferentially provides power until it gets too hot; that is, the prime stack may be configured to follow the load. When prime stack 10 gets too hot, the other stacks 10 may be configured via control of their power converters to assist and take some of the load off to drop the temperature of the prime stack. Each stack 10 may thus be controlled to take its turn in being the prime stack. By this control strategy, some embodiments of system 5 may avoid a weak stack getting exhausted. When a weak stack is prime, it may get hotter quicker so the others may be controlled to activate to assist earlier.

In some embodiments, rather than all stacks 10 being asked to deliver an equal proportion of the electrical load, one stack 10 may be assigned as prime stack. The effect of this may be that the better performing stacks work slightly harder than the others, so the degradation is more evenly spread across all stacks. Additionally, since they may be producing the same heat, they may require the same cooling and therefore may operate with same cooling flows (e.g., via gas, air, liquid, or another medium).

When a fuel cell is running, the electrolytic oxidation of hydrogen produces a voltage, which drives a current providing useful power. However, this production is not completely efficient and therefore produces waste heat. Heat estimation component 34 may perform calculations to provide estimations of the heat power. In some embodiments, heat power may be the power from the reaction (i.e., the reversible electrochemical reaction occurring in a fuel cell by the oxidation of hydrogen to create water) that is not usefully converted to electricity and thus instead converted to heat. This heat power ($P_{heat}$) may be generated using the below equation:

$$P_{heat} = \left( N_{cells} \left\{ \frac{\Delta_c H_{LHV} M_{H_2} s_{H_2}}{zF} \right\} - V_{stack} \right) I \quad (1)$$

In this equation, $N_{cells}$ is the number of cells (e.g., proton exchange membrane (PEM) fuel cells) in the stack, $\Delta_c H_{LHV}$ is the heat of combustion of hydrogen (LHV) and is measured in megajoules (MJ) per kilogram (kg), $M_{H2}$ is the molecular mass of Hydrogen and is measured in grams (g) per mol, s is the number of species used/created in the reaction (e.g., hydrogen consumption), z is the number of electrons used in the reaction (e.g., 2), F is Faraday's constant and is measured in coulombs (C) per mol, $V_{stack}$ is the output voltage setpoint for the stack and is measured by voltage sensor 40, and I is the present current drawn from the stack and is measured by current sensor 50. Equation 1, above, may become simplified to the following equation by replacing the constants with respective values:

$$P_{heat} = (1.253169873 \, N_{cells} - V_{stack}) I \quad (2)$$

The value 1.253169873 may be considered as the ideal lower heating value (LHV) voltage.

In some embodiments, heat estimation component 34 may implement a general strategy of selecting prime stack 10 based on the stacks' estimated health. For example, heat estimation component 34 may be configured to store previously determined heat powers of each stack 10 and determine a level of health of each stack 10 based on the stored (i.e., historical) heat powers of the each stack. In this or another example, power control component 32 using one or more values from heat estimation component 34 may be configured to re-set parameter values of the power converter (e.g., 20-1) associated with the prime stack (e.g., 10-1) and re-set parameter values of another power converter (e.g., one of 20-2 to 20-n) associated with another stack (e.g., one of 10-2 to 10-n) based on a respective, determined level of health such that the other stack preferentially provides power to the load. Power control component 32 and heat estimation component 34 may thus configure this change of prime stack; as a result, the other stack may be caused to degrade at a now greater rate (e.g., by running, via configuration of the respective power converter, the other stack hotter than if the other stack had not been selected to have its parameter value(s) re-set).

Processor 30 may load values from electronic storage 22, and processor 30 may learn optimal values and then store these new values to electronic storage 22. These values may include heat powers, parameter values for controlling power converters 20, values for controlling cooling equipment 60, values from sensors 55, 56, 40, 41, 50, 51, and/or one or more other devices, total up time after powering-up, total energy generated, and/or another suitable value. One or more of these values may be read from electronic storage 22 at start-up. Once running, processor 30 may log these values to electronic storage 22 or another destination.

In some embodiments, cooling control component 36 may send a control signal to each of a set of fans, impellers, and/or pumps. In some embodiments, cooling control component 36 may use output values from thermistors 55-56 to control cooling equipment 60. As such, the fans' control may be heavily dependent on heat power, this being the heat they need to cool. For example, by power control component 32 and heat estimation component 34 together being used to match heat power of prime stack 10, cooling control component 36 may effectively match air flow and fan control using temperature sensors 55-56. Due to the fan's power being a squared relationship to air flow, a most efficient (and quietist) point may be when the air flow is matched. Each of thermistors 55 (e.g., 55-1, 55-2, . . . 55-n) may be placed before stack 10, e.g., at or near an air flow conduit. And each of thermistors 56 (e.g., 56-1, 56-2, . . . 56-n) may be placed after stack 10, e.g., at another end of the air flow conduit. In some embodiments, cooling equipment 60 may be coupled to stacks 10. For example, cooling equipment 60 may comprise a set of fans, impellers, and/or pumps at or near stacks 10, e.g., at a back (or front) of system 5. Cooling equipment 60 (e.g., 60-1, 60-2, . . . 60-n) may exhaust air, hydrogen, and/or water vapor. Some embodiments of system 5 may reduce a production cost by putting stacks 10 in one airflow, in one box, and/or with one hydrogen feed going to it.

Known fuel cell stack cooling systems comprise a fixed, maximum airflow for each stack. Therefore, if a system were to have multiple units each with a same airflow and running at maximum power, then each stack would have to withstand a same amount of heat. Any power demand from a load beyond this maximum may cause the stacks to run even hotter, but these stacks have no means to disperse that excess heat, effectively exposing them to greater risk of damage and shorter lifespans. In some embodiments, power control component 32 controls power converters 20 such that an amount of cooling each of stacks 10 requires is balanced. Some embodiments may thus have cooling equipment 60 that operates evenly (e.g., passing roughly a same amount of air flow, when using fans), which causes lower parasitic power consumption than consumption by one piece of cooling equipment operating higher and by other pieces of cooling equipment operating lower (i.e., because of the way nonlinear terms in a governing equation work). Thus, even at non-maximum power, some embodiments of system 5 may have the same cooling (e.g., running at same or similar fan speeds) due to a same amount of heat being generated by each of stacks 10 so that the parasitic power consumption is lowest. Some embodiments of system 5 may thus balance the fans' speeds.

In some embodiments, power control component 32 may control each power converter 20, and heat estimation component 34 may monitor the temperature of each stack 10. By this combined approach, power control component 32 may decrease heat generation from one stack 10 if this stack is getting too hot. For example, power control component 32 may cause this decrease from the one stack by controlling an increase in heat generation from one or more other stacks 10, effectively balancing the heat powers. In this or another example, power control component 32 and heat estimation component 34 may balance the generated heat from stacks 10 by swapping that one stack 10 with another stack 10 as the prime stack or as the stack that powers a parasitic load. A temperature a heat stack 10 is subjected to or run at may be proportional to its degradation such that the hotter it is the more degradation it may undergo. Some embodiments of power control component 32 and heat estimation component 34 may thus control and reduce degradation by dynamically balancing the heat between stacks 10.

Some embodiments of processor(s) 30 may comprise a balancing algorithm, which requires power to implement. For example, during a startup phase, processor 30 may obtain power from battery 16 through a closed switch. That is, upon being turned on, a load and/or processor 30 may consume power from battery 16. For example, system 5 may comprise a switch controlled by switch control component 38 such that processor 30 ceases to receive power from the battery at an end of the powering up phase by opening the switch. That is, in this or another example, system 5 may comprise a plurality of other switches controlled by switch control component 38 such that processor 30 begins to obtain power from one or more of stacks 10-1, 10-2, . . . 10-n at the end of the powering up phase by closing the other switches. Each of these other switches may be connected between one of diodes 45 and processor 30. In some embodiments, switch control component 38 may configure the other switches such that the stacks 10 share the parasitic load. In other embodiments, switch control component 38 may configure the other switches such that one of stacks 10 powers the parasitic load. In these other embodiments, switch control component 38 may configure the other switches such the stack and power converter combination used to power the parasitic load alternates.

Some embodiments of system 5 may comprise switches for alternating stacks that deliver these voltage levels to cooling equipment 60. As such, since one stack (e.g., 10-1) may be used to power such equipment, which may consume, e.g., 200 Watts (W), this one stack may degrade faster than the other stacks 10. In some embodiments, cooling control component 36, switch control component 38, and/or power control component 32 (i.e., via parameter settings of power converters 20) may thus shift around sourcing of power to cooling equipment 60 from among stacks 10 (e.g., another stack 10-2 may then take over from stack 10-1 to power this parasitic load). It is a significant aspect of the present disclosure for system 5 to have at least one power converter 20 per stack 10 to better control the power from each stack.

An amount of stacks 10 and particular ones may be controllable by processor 30. In some embodiments, power control component 32 may determine from this amount and the ones of stacks by making and/or breaking switches such that various different combinations of stacks 10 are utilized in feeding power to processor 30. In some implementations, power lines may run from outputs of diodes 45 through a set of switches to processor 30. In this or another example, power lines may run from outputs of power converters 20 (or from outputs of current sensors 51) through switches to processor 30. In some embodiments, power control component 32 determines a sharing of parasitic loads (e.g., power consumption at processor 30 and other components, such as cooling equipment 60, sensors 55, 56, 40, 41, 50, 51, and/or one or more other devices).

In some embodiments, each of a plurality of diodes (e.g., 45-1, 45-2, . . . 45-n) may be located at or near the input of each power converter 20.

In some embodiments, system 5 may comprise a set of current censors (e.g., 50-1, 50-2, . . . 50-n) each located at an input of each power converter 20, each current sensor 50 being configured to determine a current through the respective sensor. In some embodiments, system 5 may comprise another set of current censors (e.g., 51-1, 51-2, . . . 51-n) each located at an output of each power converter 20, each current sensor 51 being configured to determine a current through the respective sensor. In some embodiments, system 5 may comprise a set of voltage sensors (e.g., 40-1, 40-2, . . . 40-n) at or near outputs of each fuel cell stack 10, each voltage sensor 40 being configured to determine a voltage relative to its respectively installed location. In some embodiments, system 5 may comprise another voltage sensor 41 at a shared, parallelized output of power converters 20, voltage sensor 41 being configured to determine a voltage relative to its installed location. Each of voltage sensing devices 40-41 may be a voltmeter, an analog multimeter, a digital multimeter, or another device configured to measure voltage (i.e., electric potential) and transmit its readings to processor 30.

In some embodiments, power control component 32 may increase one or more of a current limit and voltage setpoint of one or more power converters 20, when an amount of heat generated by prime stack 10 satisfies a criterion. In these or other embodiments, power control component 32 may decrease one or more of a current limit and voltage setpoint of the one or more power converters 20, when an amount of heat generated by the prime stack satisfies the criterion. In some embodiments, a heat power of fuel cell stacks 10 may be matched by balancing power settings (e.g., current, voltage, etc.) between power converters 20.

In some embodiments, when many stacks 10 are used, some embodiments may configure some stacks 10 to preferentially feed power to the load, e.g., while one (or more) other stack 10 is inactive. For example, power control component 32 may increase power generation from one or more stacks 10-2 to 10-n. In this or another example, power control component 32 may decrease power generation from one or more stacks 10-2 to 10-n. That is, by preferentially feeding power via stacks 10-2 to 10-n and power converters

20-2 to 20-$n$, less power may be caused to be fed via prime stack 10-1 and power converter 20-1. In some implementations, power drawn using power converters 20-2 to 20-$n$ may be caused to be adjusted such that an amount of heat generated at each of stacks 10-2 to 10-$n$ respectively associated with each of power converters 20-2 to 20-$n$ comes closer to or becomes the same as an amount of heat generated at stack 10-1 associated with power converter 20-1. For example, power control component 32 may set one or more parameter values of power converters 20-2 to 20-$n$ such that the heat of stacks 10-2 to 10-$n$ rises to balance or match the heat of stack 10-1. In another example, power control component 32 may set one or more parameter values of power converters 20-2 to 20-$n$ such that the heat of stacks 10-2 to 10-$n$ lowers to balance or match the heat of stack 10-1.

In some embodiments, heat estimation component 34 may determine how much heat each of fuel cell stacks 10 is delivering. When stack 10-1 is designated prime, power control component 32 may draw at least a nominal amount more of heat from one or more other stacks 10-2 to 10-$n$ based on the determination by heat estimation component 34. For example, to accomplish this, power control component 32 may cause an increase in a maximum current draw limit with respect to one or more power converters 20-2 to 20-$n$.

In some embodiments, heat-following stacks 10 need not necessarily be part of the same system as the prime stack. In some implementation, there may be one more stack systems mounted next to each other. In this implementation, one stack system may act as prime stack and the remaining stack system(s) may follow. This is beneficial, e.g., when the cooling flows experienced with respect to all of the stack systems is identical, such as when a single cooling fan/pump controls the cooling flow to multiple stacks. In some embodiments, cooling control component may implement a control strategy based on a temperature by naturally balancing any differences in cooling, via conduits in or in relation to which the cooling activity occurs.

In some embodiments, a control strategy may cause all of heat-following stacks 10 to meet the same heat point, which may be equal to the heat produced by the prime stack. In some implementations, after a prolonged operation, this approach may not be desirable. For example, heat-following stacks 10 may experience different conditions, causing different levels of (e.g., reversible) temporary or permanent performance loss (e.g., due to drying out or another faulty state). In this or another example, an off-set or scale to the heat set-point for at least one of heat-following stacks 10 may enable the stack to recover from performance loss.

As the prime stack is subjected to higher transient loads than heat-following stacks 10, it may degrade faster or may condition better. To ensure wear/condition levelling, power control component 32 and/or heat estimation component 34 may periodically reassign which stack is the prime stack. These reassignments may be based on an elapsed time or according to other metrics, such as the present prime stack's performance in standardized tests.

In some embodiments, a voltage output from each stack 10 may change depending on the current draw. For example, based on a polarization chart, when there is no load attached, the cells of the stacks may operate at 1.0 Volt (V). And, when there is a load drawing, e.g., several amps (A), stacks 10 may have a voltage of 0.65 V per cell. For example, each stack 10 of fuel cells may output 48 V (or 24 V or another suitable voltage, i.e., depending on a present application) unloaded.

In some embodiments, current sensors 51 may be used for confirming that power converters 20 are properly functioning. In these or other embodiments, current sensors 51 may be used for calculating output power and/or power converter losses. In some embodiments, current sensors 51 may not be used for the disclosed heat following approach except in systems where current sensors 50 are not present. In these latter embodiments, the output power of power converters 20 may be determined by multiplying the voltage measured at voltage sensor 41 by the output current measured at current sensor 51. This output power and the input voltage measured at voltage sensor 40 may be used to estimate stack 10's current, assuming a particular power converter efficiency.

In some embodiments, system 5 may comprise a software-based observer (SBO) or a hardware-based observer (HBO) safety circuit (not shown). This circuit may be a processor or microcontroller and used to monitor signals and sense-check these for any safety related fault. For example, the whole control software may not have to be proven, documented, or written to a same quality. The monitored signals may include a fuel/hydrogen inlet pressure, printed circuit board (PCB) temperature, and/or a differential pressure across stack 10 used to indicate air flow. These may trap for over temperature, under temperature, low air flow, over pressure, and pressure rising, when a valve is closed, among other functionality.

In some embodiments, power converters 20 may support any input voltage (e.g., ranging from 20 to 60 V, 9 to 60 V, or another suitable range). In some embodiments, power converters 20 may support any output voltage (e.g., about 48 V, about 24 V, or another suitable voltage). In some embodiments, power converters 20 may support any current draw (e.g., about 40 A, or another suitable amperage). In some embodiments, another power converter (not shown) may support different output voltages (e.g., 5.0 V and 3.3 V) for powering inlet valves, purge valves, a louvre motor, the various sensors disclosed herein, processor 30, and the SBO circuit. In some embodiments, valve control component 39 may be configured to control one or more of these valves (not shown). As such, processor 30 may be configured to control or otherwise interface with the balance of plant (BOP), which refers to all the supporting components and auxiliary systems of system 5 (e.g., other than stacks 10 and power converters 20) needed to deliver the energy to the load.

In some embodiments, power converter 20-1 is exactly the same as each other power converter (e.g., 20-2 to 20-$n$) in system 5. In these or other embodiments, power converter 20-1 is different from at least one of the other power converters 20 in the system.

In some embodiments, external resources 24 and/or user interface devices 18 may further comprise interfaces (not shown) for communications, such as a controller area network (CAN) for user communications, inter-system communications, and diagnostics and a stack interface board (SIB) for internal communications to provide cell voltage information and temperature measurements.

Figure 2:
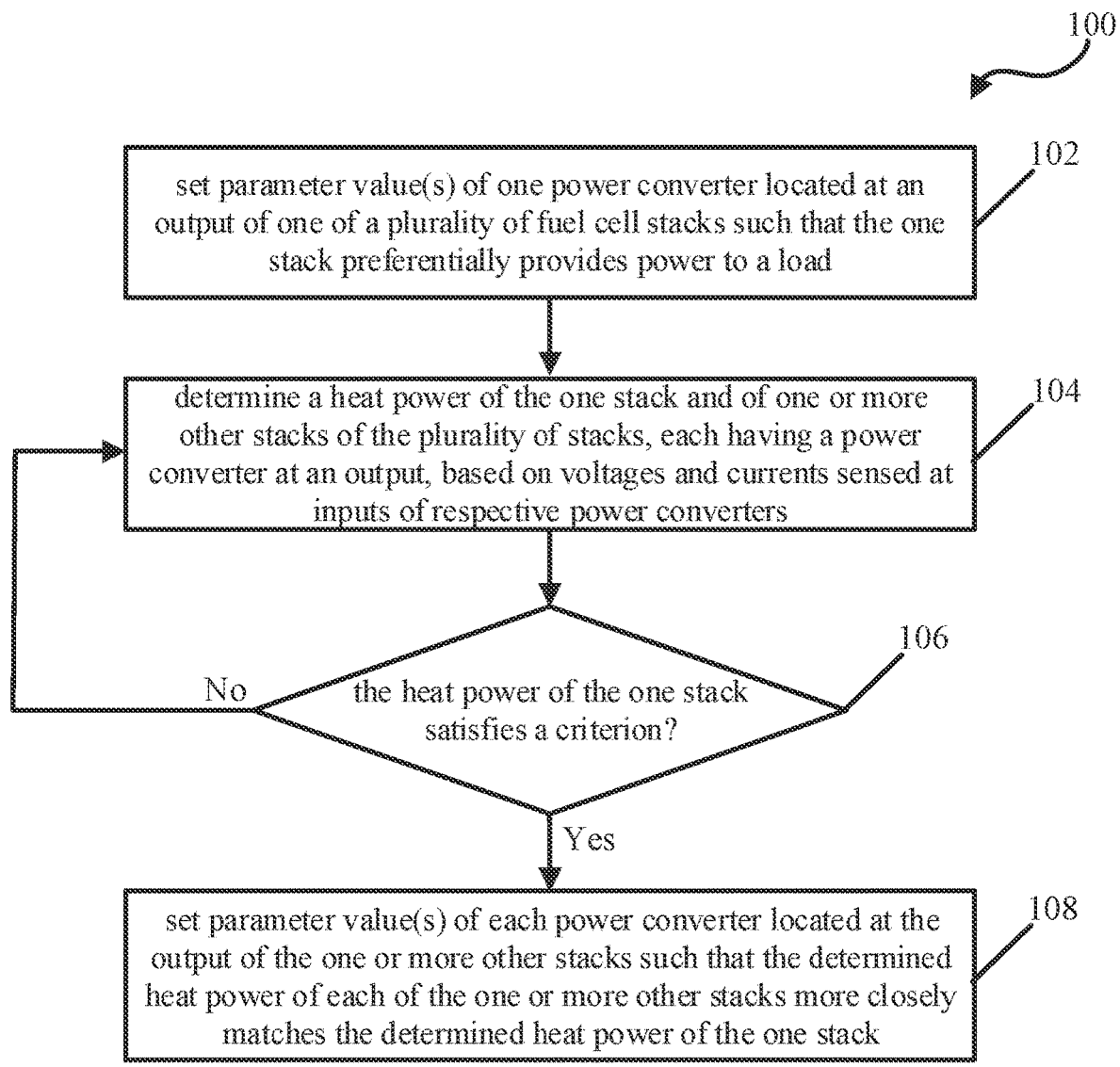
FIG. 2 illustrates a process for balancing the heat produced by the fuel cell stacks, in accordance with one or more embodiments.

FIG. 2 illustrates method 100 for load-balancing of multiple fuel cells based on a management of the heat, in accordance with one or more embodiments. Method 100 may be performed with a computer system comprising one or more computer processors and/or other components. The processors are configured by machine readable instructions to execute computer program components. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 2 and described below is not intended to be limiting. In some embodiments, method 100 may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of method 100 in response to instructions stored electronically on an electronic storage medium. The processing devices may include one or more devices configured through hardware, firmware, and/or software to be specifically designed for execution of one or more of the operations of method 100.

At operation 102 of method 100, parameter value(s) of one power converter located at an output of one of a plurality of fuel cell stacks may be set such that the one stack preferentially provides power to a load. As an example, power control component 32 (shown in FIG. 1 and described herein) may set a voltage level, a current limit, and/or turn on one power converter (e.g., 20-1) such that one stack (e.g., 10-1) associated with this one power converter operates as a prime stack. In this or another example, power control component 32 (shown in FIG. 1 and described herein) may set a voltage level, a current limit, and/or turn on each other power converter (e.g., 20-2 to 20-n). In some embodiments, operation 102 is performed by another processor component the same as or similar to power control component 32.

At operation 104 of method 100, a heat power of the one stack and of one or more other stacks of the plurality of stacks may be determined based on voltages and currents, which may be determined at inputs of respective power converters. As an example, the heat powers of stacks 10 may be determined using equation 1 or 2 (as described above). In this example, each of stacks 10 may have one power converter 20 at its output. In some embodiments, operation 104 is performed by a processor component the same as or similar to heat estimation component 34 (shown in FIG. 1 and described herein).

At operation 106 of method 100, the heat power of the one stack may be determined as to whether it satisfies one or more criteria. As an example, the heat power of stack 10-1 may be compared against a threshold. If this heat power breaches the threshold then operation 108 may be performed. Otherwise, if this heat power is less than or equal to the threshold, then operation 104 may be performed again. In some embodiments, operation 106 is performed by a processor component the same as or similar to heat estimation component 34 (shown in FIG. 1 and described herein).

At operation 108 of method 100, parameter value(s) of each power converter located at the output of the one or more other stacks may be set such that the determined heat power of each of the one or more other stacks more closely matches the determined heat power of the one stack. As an example, power control component 32 (shown in FIG. 1 and described herein) may set a voltage level and a current limit for each of the other power converters (e.g., 20-2 to 20-n) such that the associated stacks (e.g., 10-2 to 10-n) follow the heat generation of the one, prime stack. In some embodiments, operation 108 is performed by another processor component the same as or similar to power control component 32.

Techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A machine-readable medium can carry machine readable instructions in the form of code which can be executed by one or more processors of the machine. A machine-readable medium may comprise a storage medium storing the instructions, such as hard disks or removable disks; magneto-optical disks; and CD-ROM and DVD-ROM disks. Alternatively, the machine-readable medium can comprise a transient medium such as a signal, e.g. a transmission signal, an electrical signal, an electromagnetic signal, an optical signal, or an acoustic signal. The instructions can control one or more processors to carry out the processes and steps described herein and defined in the appended claims to set the parameter values of each power converter.

Several embodiments of the invention are specifically illustrated and/or described herein. However, it will be appreciated that modifications and variations are contemplated and within the purview of the appended claims.

The invention claimed is:

1. A fuel cell power system, comprising:
a plurality of fuel cell stacks;
a plurality of power converters each located at an output of a different one of the plurality of fuel cell stacks;
a plurality of current sensors each located at an input of each of the power converters, each of the current sensors being configured to determine a current;
a plurality of voltage sensors each located at the input of the each of the power converters, each of the voltage sensors being configured to determine a voltage; and
a computing device configured to:
set one or more parameter values of one of the power converters located at the output of one of the plurality of fuel cell stacks such that the one fuel cell stack preferentially provides power to a load;
determine a heat power of the one fuel cell stack and another heat power of one or more other fuel cell stacks of the plurality of fuel cell stacks, each of the heat power and the another heat power being determined based on the voltage and the current that are determined at the input of the respective power converter;
determine whether the heat power of the one stack satisfies a threshold amount of heat; and
responsive to a determination that the heat power of the one fuel cell stack satisfies the criterion, set one or more parameter values of each of the power converters located at the output of the one or more other fuel cell stacks such that the determined another heat power of each of the one or more other fuel cell stacks more closely matches the determined heat power of the one fuel cell stack.

2. The fuel cell power system of claim 1, wherein the setting of the one or more parameter values of each of the power converters located at the output of the one or more other fuel cell stacks causes an output voltage of the each power converter to be greater than an output voltage of the one power converter.

3. The fuel cell power system of claim 2, wherein the output voltage of each power converter being greater than the output voltage of the one power converter causes power to the load to be preferentially provided by the one or more other fuel cell stacks.

4. The fuel cell power system of claim 1, wherein the setting of the one or more parameter values of the one power converter causes the one fuel cell stack to preferentially provide power to the load, when an amount of power consumed by the load satisfies a threshold amount of power.

5. The fuel cell power system of claim 1, wherein outputs of the power converters are connected together such that the load is provided with power via a parallel configuration of the power converters.

6. The fuel cell power system of claim 2, wherein the output voltage of the one power converter is based on a voltage level input by a user via an interface of the fuel cell power system.

7. The fuel cell power system of claim 1, wherein the computing device is further configured to:
store previously determined heat powers of each of the plurality of fuel cell stacks; and
determine a level of health of each of the plurality of fuel cell stacks based on the stored heat powers of each of the plurality of fuel cell stacks.

8. The fuel cell power system of claim 7, wherein the one fuel cell stack preferentially provides power to the load based on the determined level of health of the one fuel cell stack being greater than the determined level of health of the one or more other fuel cell stacks.

9. The fuel cell power system of claim 8, wherein the computing device is further configured to:
reset the one or more parameter values of the one stack based on the respective, determined levels of health such that one of the one or more other stacks preferentially provides power to the load.

10. The fuel cell power system of claim 1, wherein the one or more parameter values comprise at least one of a current limit, a voltage setpoint, and an on/off setting.

11. The fuel cell power system of claim 1, wherein each of the heat power and the another heat power is further determined based on a number of cells in a respective fuel cell stack.

12. The fuel cell power system of claim 1, further comprising:
a battery configured to power the computing device, when the plurality of fuel cell stacks and power converters are powering up.

13. The fuel cell power system of claim 12, further comprising:
a plurality of diodes each located at the input of each of the power converters;
a switch, wherein the computing device is further configured to control the switch such that the computing device ceases to receive power from the battery at an end of the powering up; and
a plurality of other switches each of which connects between one of the diodes and the computing device, wherein the computing device is further configured to control the other switches such that the computing device begins to receive power from one or more of the plurality of fuel cell stacks.

14. The fuel cell power system of claim 13, wherein the power converters are buck-boost converters.

15. The fuel cell power system of claim 1, further comprising:
a plurality of fans each located near a different one of each of the plurality of fuel cell stacks; and
a plurality of temperature sensors located at inputs and outputs of each of the plurality of fuel cell stacks and that correspond to a flow of air through each of the plurality of fuel cell stacks,
wherein the computing device is further configured to determine a speed of each of the fans based on temperature readings from the temperature sensors, and
wherein the speeds of the fans are substantially the same, when the determined another heat power of each of the one or more other fuel cell stacks more closely matches the determined heat power of the one fuel cell stack.

* * * * *